United States Patent [19]

Watkins et al.

[11] Patent Number: 5,906,771
[45] Date of Patent: *May 25, 1999

[54] MANUFACTURING PROCESS FOR HIGH-PURITY PHOSPHORS HAVING UTILITY IN FIELD EMISSION DISPLAYS

[75] Inventors: Charles M. Watkins; Surjit S. Chadha, both of Meridian, Id.

[73] Assignee: Micron Technology, Inc., Bosie, Id.

[*] Notice: This patent is subject to a terminal disclaimer.

[21] Appl. No.: 08/974,749

[22] Filed: Nov. 19, 1997

Related U.S. Application Data

[63] Continuation of application No. 08/755,091, Nov. 22, 1996, abandoned, which is a continuation of application No. 08/488,795, Jun. 8, 1995, Pat. No. 5,601,751.

[51] Int. Cl.⁶ ............................. C09K 11/00; C09K 11/08
[52] U.S. Cl. .......................... 252/301.4 R; 252/301.4 H; 252/301.4 P; 252/301.4 F; 252/301.5; 252/301.6 R; 252/301.6 S; 252/301.6 F; 252/301.6 P; 252/301.4 S
[58] Field of Search ...................... 252/301.4 R, 301.4 H, 252/301.4 P, 301.4 F, 301.4 S, 301.5, 301.6 R, 301.6 S, 301.6 P

[56] References Cited

U.S. PATENT DOCUMENTS

| | | | |
|---|---|---|---|
| 3,965,031 | 6/1976 | Klein et al. | 252/301.4 R |
| 4,024,069 | 5/1977 | Larach | 252/301.4 R |
| 4,100,454 | 7/1978 | Hase et al. | 252/301.4 R |
| 4,119,562 | 10/1978 | Kagami et al. | 252/301.6 S |
| 4,191,662 | 3/1980 | Mathers et al. | 252/301.4 R |
| 4,215,289 | 7/1980 | De Hair et al. | 252/301.4 R |
| 4,275,333 | 6/1981 | Kagami et al. | 252/301.4 R |
| 4,350,604 | 9/1982 | Awazy et al. | 252/301.4 R |
| 4,370,287 | 1/1983 | Thompson | 264/67 |
| 4,469,619 | 9/1984 | Ohno et al. | 252/301.4 R |

(List continued on next page.)

FOREIGN PATENT DOCUMENTS 1004260  9/1965  United Kingdom.

OTHER PUBLICATIONS

Wanmaker, William L. et al., "Luminescence of Phosphates", Chemical Abstracts, vol. 69, No. 16, Oct. 14, 1968.
Su, MIan Zeng et al., "The Reaction Mechanism for the Synthesis of Europium(2+)–Activated Barium Fluoride Chloride", Chemical Abstracts, vol. 99, No. 20, Nov. 14, 1983.
Mitsui Toatsu Chem Inc., "Preparation of Particulate Phosphor", Japanese Patent Application No. 1,178,583, Patent Abstracts of Japan, vol. 13, No. 461, Oct. 18, 1989.
Rao, R. P., "Preparation and Characterization of Fine–Grain Yttrium–Based Phosphors by Sol–Gel Process", Journal of the Electrochemical Society, vol. 143, No. 1, Jan. 1996, pp. 189–197.

Primary Examiner—Melissa Bonner
Attorney, Agent, or Firm—Rodney F. Brown

[57] ABSTRACT

A process is provided for manufacturing high-purity phosphors having utility in field emission displays. The high-purity phosphor is a host lattice infiltrated by a dopant that activates luminescent properties therein. The lattice and dopant are initially milled together to reduce their average particle size while simultaneously achieving complete mixing between the lattice and the dopant. The resulting mixture is maintained free of a flux or substantially any other treatment agent capable of contaminating the phosphor and placed in a heating vessel formed from a substantially impervious contaminant-free material. The mixture is heated to a high temperature effectuating thorough infiltration of the dopant into the lattice structure. The use of an impervious contaminant-free heating vessel and the exclusion of flux or other treatment agents from the mixture avoids undesirable contamination and undue particle size growth of the phosphor product during the manufacture thereof. Accordingly, product is a high-purity phosphor having a small average particle size, yet exhibiting sufficient luminescent efficiencies for utility in field emission displays as a luminescent coating for the anode screen.

23 Claims, 1 Drawing Sheet

U.S. PATENT DOCUMENTS

| | | | |
|---|---|---|---|
| 4,524,300 | 6/1985 | Rutten et al. | 252/301.4 R |
| 4,719,387 | 1/1988 | Catherall | 252/301.4 R |
| 4,791,336 | 12/1988 | Morimoto et al. | 252/301.4 R |
| 4,822,696 | 4/1989 | Lammers et al. | 428/690 |
| 4,840,747 | 6/1989 | Fan et al. | 252/301.4 R |
| 4,894,583 | 1/1990 | Berkstresser et al. | 313/468 |
| 4,924,593 | 5/1990 | Morita et al. | 313/468 |
| 4,925,593 | 5/1990 | Borchardt et al. | 252/301.6 S |
| 5,104,573 | 4/1992 | Ono et al. | 252/301.4 R |
| 5,115,306 | 5/1992 | Tsuda et al. | 358/60 |
| 5,140,449 | 8/1992 | Sluzky et al. | 252/301.4 R |
| 5,185,553 | 2/1993 | Yang et al. | 313/468 |
| 5,202,777 | 4/1993 | Sluzky et al. | 252/301.4 R |
| 5,213,712 | 5/1993 | Dole | 252/301.4 R |
| 5,229,331 | 7/1993 | Doan et al. | 437/228 |
| 5,232,549 | 8/1993 | Cathey et al. | 456/633 |
| 5,367,173 | 11/1994 | Morlotti | 252/301.4 R |
| 5,455,489 | 10/1995 | Bhargava | 315/169.4 |
| 5,601,751 | 2/1997 | Watkins et al. | 252/301.4 R |

MANUFACTURING PROCESS FOR HIGH-PURITY PHOSPHORS HAVING UTILITY IN FIELD EMISSION DISPLAYS

This application is a continuation of application Ser. No. 08/755,091, filed Nov. 22, 1996, now abandoned, which claims the benefit of application Ser. No. 08/488,795, filed Jun. 8, 1995, now U.S. Pat. No. 5,601,751.

This invention was made with Government support under Contract No. DABT63-93-C-0025 awarded by Advanced Research Projects Agency (ARPA). The Government has certain rights in this invention.

TECHNICAL FIELD

The present invention relates generally to the manufacture of phosphors, and more particularly to a process for manufacturing high-purity phosphors used in field emission displays.

BACKGROUND OF THE INVENTION

Luminescent materials, termed phosphors, have general utility in a broad range of lighting and display applications. A phenomenon common to all such applications is excitation of the phosphors in accordance with any one of a number of techniques known in the art, causing the phosphors to emit light. Known excitation techniques include exposing the phosphors to emissions from an external energy source. The emissions can be in the form of electrons, ultra violet, x-rays, or gamma rays, to name a few. Hence, this excitation phenomenon is apparent in virtually all types of conventional, phosphor-containing, host lighting or display fixtures. Among such conventional fixtures are fluorescent tubes, cathode ray tubes, liquid crystal displays, gas discharge plasma displays, vacuum fluorescent displays, and field emission displays.

Cathode ray tubes are typical of luminescent displays employing electron emissions as the excitation means for the phosphors. Such displays have an anode panel coated with phosphors that are selectively excited by electrons directed toward the phosphors from an adjacent electron-supplying cathode. The excited phosphors emit light, thereby creating a desired image visible to the viewer on the screen of the display. Phosphors having utility for display applications typically comprise a host lattice impregnated with a quantity of a dopant that activates luminescent properties in the resulting composition. The phosphors are conventionally manufactured by selecting the host lattice and dopant from among well-known materials. The selected lattice and dopant are mixed together and milled to a relatively uniform particle size distribution. A typical average particle size for the mixture is on the order of about 10 microns because it is believed that such relatively large particle sizes contribute to the luminescent efficiency of the resulting phosphor product. A flux is also generally added to the mixture to facilitate subsequent heat treatment thereof. Fluxes having utility in the preparation of phosphors are characterized as materials having a relatively low melting point typically about 1000° C. or less that promote infiltration of the dopant into the lattice structure when heated. Conventional fluxes include ammonium compounds, such as ammonium chloride, and compounds combining Group I A or II A elements and Group VI A or VII A elements, such as alkali metal halides and alkaline earth metal halides. Other agents facilitating heat treatment of the lattice and dopant mixture can also be combined with the mixture such as sulfur which serves as an antioxidant.

The composition comprising the host lattice, dopant, and flux, as well as any other selected treatment agents, is placed in a crucible formed from a refractory material, such as silica or alumina, and heated above the melting point of the flux to effectuate infiltration of the dopant into the host lattice. The presence of the flux, however, tends to induce excessive growth of the lattice particles during heat treatment. Consequently, the heat treated composition may be remilled following heat treatment to restore it to its original pretreatment particle size. Unfortunately, remilling the heat treated particles can negatively impact the luminescent efficiency of the resulting phosphor product by exposing surfaces of the phosphor product having relatively low dopant concentrations. In any case, a final step in the manufacture of phosphors is removal of the flux from the particles by means such as water or acid washing to obtain the desired phosphor product.

Although the above-described prior art process produces phosphors of adequate purity for many conventional display applications including cathode ray tubes, it has been found that present-day field emission display applications require phosphors of greater purity than those produced by such prior art processes. Specifically, it has been found that residual quantities of flux unduly contaminate phosphor products manufactured in accordance with prior art processes even after washing the product. Contaminants retained by the phosphors from the flux, namely Group I A or II A cations, are often at times generally incompatible with silicon structures employed in the displays. More particularly, such contaminants can cause failure of field emission displays because the emitter tips that serve as the cathodes of a field emission display are extremely sensitive to contamination. The positively charged Group I A or II A cations are highly mobile in the evacuated environment of field emission displays. Group I A and II A cations readily migrate the relatively short distance from the anode plate to the cathodic emitter tips. An excessive accumulation of such cations on the emitter tips causes irreparable damage thereto. Refractory crucibles can likewise contribute Group I A or II A contaminants to the phosphor product due to their relative porosity that retains such contaminants and undesirably releases them into the phosphor product when heated.

As such, a need exists for a high-purity phosphor having specific utility to field emission display applications. Accordingly, it is an object of the present invention to provide a process for manufacturing a high-purity phosphor that satisfies the performance demands of field emission displays. More particularly, it is an object of the present invention to provide a process for manufacturing a high-purity phosphor that does not require a flux or any other treatment agent during heat treatment of the lattice and dopant. It is another object of the present invention to provide a process for manufacturing a high-purity phosphor, wherein the product is substantially free of contaminants from fluxes, other treatment agents, or process vessels which could diminish the operability of cathodic emitter tips employed with the phosphors in a field emission display. It is yet another object of the present invention to provide a process for manufacturing a high-purity phosphor having a relatively small particle size, yet having an acceptable luminescent efficiency. It is still another object of the present invention to provide a process for manufacturing a high-purity phosphor, wherein the lattice and dopant are heat treated at a relatively high temperature without substantially increasing the particle size thereof. It is a further object of the present invention to provide a process for manufacturing a high-purity phosphor, wherein the dopant is well distributed throughout the host lattice. These objects and others are accomplished in accordance with the invention described hereafter.

SUMMARY OF THE INVENTION

The present invention is a process for manufacturing high-purity phosphors having utility in luminescent displays, and specifically field emission displays. The phosphor produced by the present process comprises a host lattice infiltrated by a dopant that activates luminescent properties in the resulting composition. In accordance with the process, a conventional lattice is initially provided in particulate form that is capable of hosting a selected dopant also provided in particulate form. The lattice and dopant particles are processed together into a fine powder, substantially reducing their average particle size while simultaneously achieving complete mixing between the lattice and the dopant. The resulting mixture is maintained free of a flux or substantially any other treatment agent capable of contaminating the phosphor product with Group I A or II A contaminants and placed in a heating vessel formed from a substantially impervious contaminant-free material. The vessel and its contents are heated to a relatively high temperature effectuating thorough infiltration of the dopant into the lattice structure.

The use of an impervious contaminant-free heating vessel and the exclusion of flux or other treatment agents from the mixture avoids undesirable contamination and undue particle size growth of the phosphor product during the manufacture thereof. Accordingly, the present process desirably produces relatively high-purity phosphors having a relatively small average particle size, yet exhibiting sufficient luminescent efficiencies for utility in field emission display applications. The process of the present invention will be further understood from the drawings and the following detailed description.

DESCRIPTION OF PREFERRED EMBODIMENTS

Figure 1:
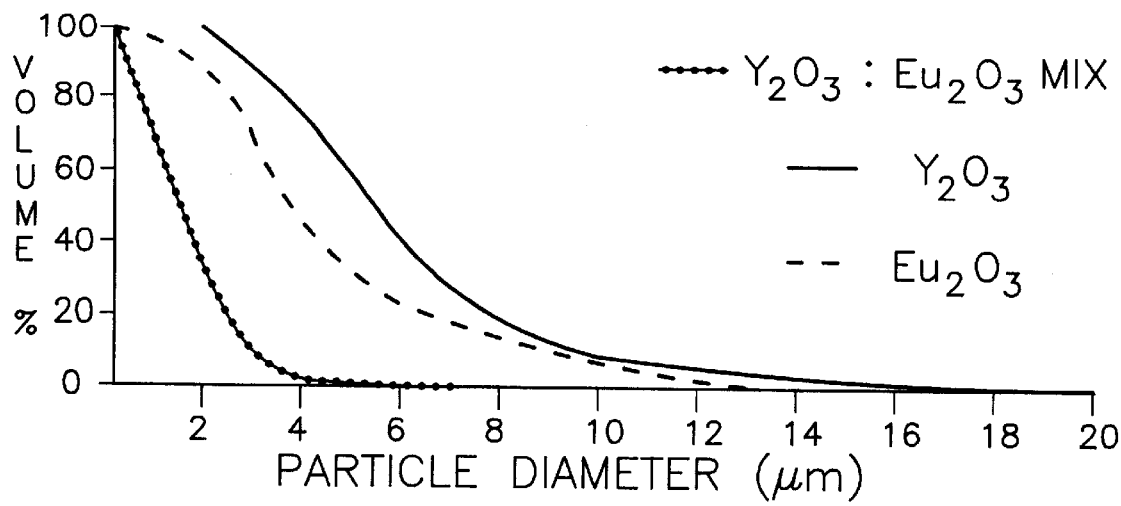
FIG. 1 is a graphical representation of the particle size distributions of precursor materials before and after grinding in accordance with the present invention.

The present invention relates to a process for manufacturing a phosphor from precursor materials, wherein the precursor materials are heat treated at a relatively high temperature in a substantially contaminant-free environment absent fluxes or other contaminant-generating materials to achieve a high-purity phosphor product having specific utility in field emission displays. A high-purity phosphor is defined herein as a luminescent composition having at least one host lattice and at least one dopant impregnated therein, but substantially free of any contaminants capable of causing failure or otherwise disrupting operation of the cathode in a luminescent display. In particular, the high-purity phosphor is substantially free of any cationic contaminants, and more particularly substantially free of any Group I A or II A cations, contributed by fluxes or other treatment agents that are capable of damaging the cathodic emitter tips of a field emission display. The term "substantially free" relates to species having no detectable concentration within the high-purity phosphor or having a concentration below about one part per million within the high-purity phosphor.

The precursor materials of the phosphor consist of the one or more selected host lattices and the one or more selected dopants prior to the performance of any treatment steps hereunder. It is further noted that the selected precursor materials are preferably provided in a solid particulate form. Compositions of host lattices having utility in the present invention are well known to the skilled artisan and include such species as silicates, aluminates, oxides, garnets, gallates, vandates, tungstates, phosphates, pyrophosphates, fluorides, oxysulfides, and mixtures thereof. Preferred compositions of the host lattice are oxides of yttrium or gallates. Gallates are binary species formed by combining oxides of gallium and oxides of one or more selected metals, such as zinc, in stoichiometric amounts. An exemplary gallate is $(Zn_1Ga)_xO_y$. Compositions of dopants having utility in the present invention are likewise well known to the skilled artisan and such dopants are alternately termed activators. Useful dopants include one or more selected transition elements, and in particular one or more selected lanthanides and/or one or more selected transition metals, such as europium, terbium, cerium, manganese, copper, aluminum, gold, silver, and mixtures thereof. Among the preferred dopants are europium, cerium, and terbium. The precursor materials preferably consist of a unitary host lattice and a unitary dopant, a binary host lattice and a unitary dopant, or a unitary host lattice and a binary dopant. Phosphors produced from a unitary host lattice and a unitary dopant are termed binary phosphors, while phosphors produced from a binary host lattice and a unitary dopant or from a unitary host lattice and a binary dopant are termed ternary phosphors.

As can be appreciated by the skilled artisan, an important criterium for selection of the specific precursor materials is the desired color of light to be emitted by the resulting phosphor manufactured in accordance with the present process. It is well understood that specific phosphors emit either red, blue or green light.

Upon selection of the precursor materials in accordance with the above-recited criteria, the precursor materials, i.e., the lattice and dopant, are placed together in a processing vessel substantially free of any other active species or of any contaminant-generating species to obtain a reduced uniform particle size distribution thereof and to achieve complete mixing between the lattice and dopant particles. The lattice and dopant are added to the processing vessel in relative amounts such that the dopant typically comprises from about 0.1% to about 10.0% by weight of the precursor materials retained in the vessel, the remaining weight percentage of the precursor materials being the host lattice. The preferred processing vessel of this step is a particle size reduction vessel, and more particularly a milling vessel utilized in a mill such as a McCrone mill, a Fritsch planetary mill, or a conventional ball mill. Most preferred among these mills are reciprocating mills, such as the McCrone mill. Although, as noted above, the precursor materials are maintained substantially free of any other active species or of any contaminant-generating species during this step, an inert, non-contaminating liquid medium is often combined with the precursor materials to form a slurry within the milling vessel, thereby enhancing the effectiveness of the milling step. In any case, the precursor materials are sufficiently milled in the selected mill to obtain a mixture of the lattice and dopant having an average particle size less than about 2 microns and preferably less than about 1 micron. If a liquid medium is employed in the milling step, the slurry containing the milled mixture of precursor materials is thoroughly dried to drive substantially all of the liquid medium therefrom.

The next step in the sequence of the process is to heat treat the milled mixture of precursor materials, thereby thoroughly impregnating the dopant within the host lattice structure. The high purity of the eventual phosphor product is insured by heat treating the milled mixture of precursor materials in the absence of any fluxes or other agents that are capable of introducing contaminants, and particularly Group I A or Group II A contaminants, into the mixture. Accordingly, the composition being heat treated is essentially limited to the milled mixture containing the host lattice and dopant and is substantially free of any contaminants that could impair operation of the cathode when the phosphor product is employed in a luminescent display. The high purity of the phosphor product is further insured by employing a relatively pure, substantially impervious, nonporous crucible as the containment vessel for the milled mixture during heat treatment thereof such that process equipment contacting the heated mixture does not introduce any contaminants therein. Crucibles satisfying these criteria are formed, for example, from platinum or iridium, of which platinum is preferred.

Heat treatment of the milled mixture is performed by placing the crucible and its contents in a conventional heating means such as an oven or a kiln. The milled mixture is heated therein to a temperature between about 1200° C. and 2000° C., preferably between about 1400° C. and 1800° C., and more preferably to about 1600° C. The mixture is typically maintained in the heating means within the above-prescribed temperature range for a time period between about 0.5 and about 6.0 hours or more depending on the specific composition of the mixture. The atmosphere of the heating means is air or a reducing atmosphere such as carbon monoxide or hydrogen gas. Sulfur-containing atmospheres are preferably avoided, as exposure to sulfur-containing gases may be detrimental to the resulting phosphor product. Under these conditions, the dopant thoroughly permeates the host lattice structure, but due to the absence of a flux, the product does not exhibit substantial particle size growth. The average particle size of the product after heat treatment is generally no greater than 100% larger than the average particle size of the mixture prior to heat treatment, and preferably no greater than 50%. Consequently, manufacture of the phosphor product is essentially complete upon performance of the heat treatment, obviating the need to remill or wash the product.

The resulting high-purity phosphor product has general utility for conventional luminescent lighting and display applications, enhancing the performance thereof. The high-purity phosphor product, however, has specific utility in field emission display applications. Field emission display devices employ cold cathode emitters in the form of a plurality of emitter tips that direct electron emissions in an evacuated environment toward an adjacent anode screen in relatively close proximity thereto. The anode screen has a phosphor coating applied that is excited by electrons from the emitter tips, thereby selectively illuminating the screen. Numerous embodiments of such field emission display devices are known in the art, for example, as disclosed by U.S. Pat. Nos. 5,229,331 and 5,232,549, which are incorporated herein by reference. Accordingly, a high-purity phosphor produced in the manner of the present invention is substituted for those phosphors disclosed in the prior art as the coating on the anode screen of the field emission display. The present high-purity phosphors have been found to enhance both the performance and the longevity of field emission displays in which the phosphors are employed as a coating on the anode screen because the high-purity phosphors do not contain contaminants that adversely affect the emitter tips diminishing the expected useful lifetime of the display device.

The following examples demonstrate the practice and utility of the present invention, but are not to be construed as limiting the scope thereof.

EXAMPLE 1

A pair of stock precursor materials is selected consisting of a $Y_2O_3$ host lattice and a $Eu_2O_3$ dopant, both in particulate form. The precursor materials are placed in a particle size analyzer and the majority of the particles are determined to exceed 4 microns in size. In particular, the $Y_2O_3$ host lattice has a measured average particle size of 5.336 microns and the $Eu_2O_3$ dopant has a measured average particle size of 4.031 microns. Curves indicating the particle size distribution of the host lattice and the dopant, respectively, are displayed together in FIG. 1. The precursor materials are then placed in a liquid medium to form a slurry and milled together in a McCrone mill. The average particle size of the resulting milled mixture of precursor materials is 1.615 microns. A curve indicating the particle size distribution of the milled mixture of precursor materials is displayed in FIG. 1 adjacent to the particle size distribution curves of the host lattice and the dopant. FIG. 1 demonstrates that the precursor materials undergo substantial particle size reduction when milled in accordance with the process of the present invention.

EXAMPLE 2

Figure 2:
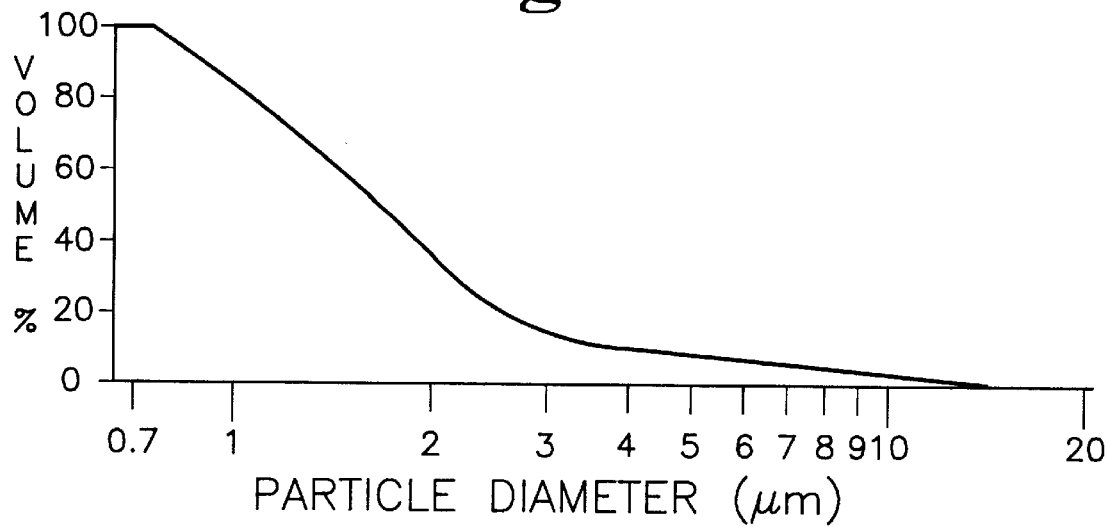
FIG. 2 is a graphical representation of the particle size distribution of a phosphor product produced in accordance with the present invention.
Figure 3:
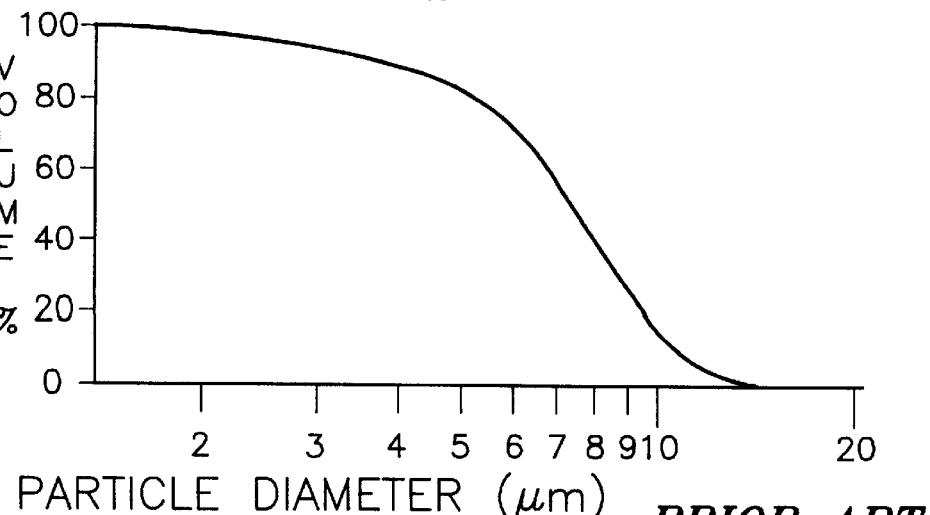
FIG. 3 is a graphical representation of the particle size distribution of a commercial grade phosphor produced in accordance with conventional prior art methods.

A $Y_2O_3$:Eu phosphor product is produced from a $Y_2O_3$ host lattice and a $Eu_2O_3$ dopant by initially milling the precursor materials in substantially the same manner as Example 1. The milled mixture of precursor materials is then dried overnight at a temperature of 90° C. The dried milled mixture is heat treated by firing it in the absence of a flux or any other treatment agents for a period of 2 hours at a temperature of 1550° C. to complete formation of the desired $Y_2O_3$:Eu phosphor product. Size analysis of the resulting phosphor product indicates that it has an average particle size of 1.810 microns. A curve indicating the particle size distribution of the phosphor product is displayed in FIG. 2. For comparison purposes, a size analysis is conducted on a commercial grade $Y_2O_3$:Eu phosphor produced in accordance with conventional prior art methods indicating that the commercial grade phosphor has an average particle size of 7.090 microns. FIG. 3 shows the particle size distribution of the commercial grade phosphor. Comparison of FIGS. 2 and 3 demonstrates that the phosphor product produced in accordance with the present invention achieves a substantially reduced particle size relative to conventional phosphors without requiring post heat-treatment milling of the product. Compositional analysis of the phosphor product of FIG. 2 also shows that it is substantially free of any contaminants. Accordingly, the phosphor product is suitably pure for use as an effective anode screen coating in a conventional field emission display.

While forgoing preferred embodiments of the invention have been described and shown, it is understood that alternatives and modifications, such as those suggested and others, may be made thereto and fall within the scope of the invention.

We claim:

1. A process for preparing a high-purity phosphor having utility as a luminescent in a field emission display, said process comprising:

providing a host lattice starting material and a dopant starting material;

combining said host lattice starting material and said dopant starting material in a precursor mixture having an average unprocessed particle size and substantially free of any cationic contaminants capable of damaging cathodic emitter tips of a field emission display;

processing said precursor mixture to obtain a sized precursor mixture having an average precursor particle size less than about 2 microns;

placing said sized precursor mixture in a heat treatment vessel formed from a substantially impervious material not introducing cationic contaminants into said sized precursor mixture or into a high-purity phosphor produced from said sized precursor mixture; and heating said sized precursor mixture in said heat treatment vessel to a temperature between about 1200° C. and 2000° C. for a time sufficient to infiltrate said dopant starting material into said host lattice starting material, thereby producing said high-purity phosphor.

2. A process for preparing a high-purity phosphor as recited in claim 1 wherein said host lattice starting material is selected from the group consisting of silicates, aluminates, oxides, gallates, vandates, tungstates, phosphates, fluorides, oxysulfides, and mixtures thereof.

3. A process for preparing a high-purity phosphor as recited in claim 1 wherein said dopant starting material is selected from the group consisting of lanthanides, transition metals and mixtures thereof.

4. A process for preparing a high-purity phosphor as recited in claim 1 wherein said high-purity phosphor is a binary or a ternary phosphor.

5. A process for preparing a high-purity phosphor as recited in claim 1 wherein said sized precursor mixture is heated to a temperature between about 1400° C. and 1800° C.

6. A process for preparing a high-purity phosphor as recited in claim 1 wherein said substantially impervious material forming said heat treatment vessel is platinum or iridium.

7. A process for preparing a high-purity phosphor as recited in claim 1 wherein said average precursor particle size is less than about 1 micron.

8. A process for preparing a high-purity phosphor as recited in claim 1 wherein said phosphor has an average product particle size no greater than about 100% larger than said average precursor particle size.

9. A process for preparing a high-purity phosphor as recited in claim 1 wherein said phosphor has an average product particle size no greater than about 50% larger than said average precursor particle size.

10. A process for preparing a high-purity phosphor as recited in claim 1 wherein said precursor mixture is substantially free of any fluxes.

11. A process for preparing a high-purity phosphor as recited in claim 1 wherein said cationic contaminant is a Group I A or a Group II A ion.

12. A process for preparing a high-purity phosphor as recited in claim 1 wherein said precursor mixture is processed to obtain said sized precursor mixture by milling said precursor mixture in a reciprocating mill, thereby reducing said average unprocessed particle size of said precursor mixture to said average precursor particle size of said sized precursor mixture.

13. A process for manufacturing an anode of a field emission display having a high-purity phosphor coating, said process comprising:

providing a host lattice starting material and a dopant starting material;

combining said host lattice starting material and said dopant starting material in a precursor mixture having an average unprocessed particle size and substantially free of any cationic contaminants capable of damaging cathodic emitter tips of a field emission display;

processing said precursor mixture to obtain a sized precursor mixture having an average precursor particle size less than about 2 microns;

placing said sized precursor mixture in a heat treatment vessel formed from a substantially impervious material not introducing cationic contaminants into said sized precursor mixture or into a high-purity phosphor produced from said sized precursor mixture;

heating said sized precursor mixture in said heat treatment vessel to a temperature between about 1200° C. and 2000° C. for a time sufficient to infiltrate said dopant starting material into said host lattice starting material, thereby producing said high-purity phosphor; and applying said high-purity phosphor to an anode screen of said field emission display.

14. A process for preparing a high-purity phosphor as recited in claim 13 wherein said host lattice starting material is selected from the group consisting of silicates, aluminates, oxides, gallates, vandates, tungstates, phosphates, fluorides, oxysulfides, and mixtures thereof.

15. A process for preparing a high-purity phosphor as recited in claim 13 wherein said dopant starting material is selected from the group consisting of lanthanides, transition metals and mixtures thereof.

16. A process for preparing a high-purity phosphor as recited in claim 13 wherein said high-purity phosphor is a binary or a ternary phosphor.

17. A process for preparing a high-purity phosphor as recited in claim 13 wherein said substantially impervious material forming said heat treatment vessel is platinum or iridium.

18. A process for preparing a high-purity phosphor as recited in claim 13 wherein said average precursor particle size is less than about 1 micron.

19. A process for preparing a high-purity phosphor as recited in claim 13 wherein said precursor mixture is processed to obtain said sized precursor mixture by milling said precursor mixture in a reciprocating mill, thereby reducing said average unprocessed particle size of said precursor mixture to said average precursor particle size of said sized precursor mixture.

20. A process for preparing a high-purity phosphor as recited in claim 13 wherein said cationic contaminant is a Group I A or a Group II A ion.

21. A process for preparing a high-purity phosphor having utility as a luminescent in a field emission display, said process comprising:

providing a host lattice starting material selected from the group consisting of silicates, aluminates, oxides, gallates, vandates, tungstates, phosphates, fluorides, oxysulfides, and mixtures thereof, and providing a dopant starting material selected from the group consisting of lanthanides, transition metals, and mixtures thereof;

combining said host lattice starting material and said dopant starting material in a precursor mixture having an initial average particle size, wherein said precursor mixture consists essentially of said host lattice starting material and said dopant starting material and is substantially free of any cationic contaminants capable of damaging cathodic emitter tips of a field emission display;

milling said precursor mixture to obtain a sized precursor mixture having an average precursor particle size less than about 1 micron;

placing said sized precursor mixture in a heat treatment vessel formed from a substantially impervious material not introducing cationic contaminants into said sized precursor mixture or into a high-purity phosphor produced from said sized precursor mixture; and heating said sized precursor mixture in said heat treatment vessel to a temperature between about 1400° C. and 1800° C. for a time sufficient to infiltrate said dopant starting material into said host lattice starting material, thereby producing said high-purity phosphor.

22. A process for preparing a high-purity phosphor as recited in claim 21 wherein said phosphor has an average product particle size no greater than about 50% larger than said average precursor particle size.

23. A process for preparing a high-purity phosphor as recited in claim 21 wherein said cationic contaminant is a Group I A or a Group II A ion.

* * * * *